United States Patent
Kuramochi

(10) Patent No.: US 11,874,512 B2
(45) Date of Patent: Jan. 16, 2024

(54) OPTICAL MODULE

(71) Applicant: FUJITSU OPTICAL COMPONENTS LIMITED, Kawasaki (JP)

(72) Inventor: Kazuyuki Kuramochi, Yuki (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 229 days.

(21) Appl. No.: 17/067,424

(22) Filed: Oct. 9, 2020

(65) Prior Publication Data

US 2021/0149133 A1  May 20, 2021

(30) Foreign Application Priority Data

Nov. 15, 2019 (JP) .................................. 2019-207521

(51) Int. Cl.
*H04B 10/00* (2013.01)
*G02B 6/42* (2006.01)

(52) U.S. Cl.
CPC ......... *G02B 6/4261* (2013.01); *G02B 6/4277* (2013.01)

(58) Field of Classification Search
CPC ............................ G02B 6/4261; G02B 6/4277
See application file for complete search history.

(56) References Cited

U.S. PATENT DOCUMENTS

| | | | |
|---|---|---|---|
| 6,884,097 B2 * | 4/2005 | Ice ....................... | G02B 6/4261 361/728 |
| 7,070,439 B2 * | 7/2006 | Ishigami .............. | G02B 6/4201 439/372 |
| 9,146,366 B2 * | 9/2015 | Koutrokois .......... | G02B 6/4277 |
| 9,523,826 B2 * | 12/2016 | Tsai ...................... | G02B 6/4261 |
| 9,551,847 B2 * | 1/2017 | Wang ................... | G02B 6/4292 |
| 9,720,189 B1 * | 8/2017 | Wang ................... | G02B 6/4261 |

(Continued)

FOREIGN PATENT DOCUMENTS

| | | |
|---|---|---|
| CN | 104838300 A | 8/2015 |
| CN | 107567593 A | 1/2018 |

(Continued)

OTHER PUBLICATIONS

First Notification of Office Action dated Apr. 1, 2022 in corresponding Chinese Patent Application No. 202011096432.9 (7 pages) (8 pages English Translation).

(Continued)

*Primary Examiner* — Agustin Bello
(74) *Attorney, Agent, or Firm* — STAAS & HALSEY LLP

(57) ABSTRACT

An optical module includes: a module body that is configured to be inserted into a cage, at an entrance of the cage an electromagnetic wave shielding terminal being provided, and has a groove formed on one surface thereof and configured to engage with a latch part formed on the cage; and an engagement release member including a body that is provided with a pull tab, the body being slidably attached to the module body and configured to slide in response to an external force, and an arm part that extends from the body along the groove, and slides with respect to the groove in conjunction with the sliding of the body and release the engagement in a state in which the electromagnetic wave shielding terminal is pressed. The module body has a concave part on a surface of the groove, the surface being in contact with the arm part.

9 Claims, 10 Drawing Sheets

(56) References Cited

U.S. PATENT DOCUMENTS

| | | | |
|---|---|---|---|
| 9,929,500 B1* | 3/2018 | Ista | H01R 13/6271 |
| 10,440,799 B2* | 10/2019 | Zheng | H05K 9/0058 |
| 10,578,818 B1* | 3/2020 | Chen | G02B 6/4284 |
| 10,606,001 B1* | 3/2020 | Ko | G02B 6/4246 |
| 10,746,947 B2* | 8/2020 | Chan | G02B 6/3893 |
| 10,809,474 B2* | 10/2020 | Wang | G02B 6/3897 |
| 10,955,628 B2* | 3/2021 | Turcotte | G02B 6/4246 |
| 2004/0033027 A1* | 2/2004 | Pang | G02B 6/3825 |
| | | | 385/53 |
| 2005/0148223 A1* | 7/2005 | Shirk | H01R 13/6275 |
| | | | 439/160 |
| 2005/0191892 A1* | 9/2005 | Ishigami | G02B 6/4201 |
| | | | 439/372 |
| 2005/0226587 A1* | 10/2005 | Minota | G02B 6/4292 |
| | | | 385/53 |
| 2006/0215968 A1* | 9/2006 | Kayner | G02B 6/4246 |
| | | | 385/88 |
| 2006/0270275 A1 | 11/2006 | Morohashi et al. | |
| 2007/0189673 A1* | 8/2007 | Yoshikawa | G02B 6/4266 |
| | | | 385/88 |
| 2008/0089649 A1* | 4/2008 | Wang | G02B 6/4284 |
| | | | 385/56 |
| 2008/0145006 A1* | 6/2008 | Ice | G02B 6/4256 |
| | | | 385/93 |
| 2013/0183846 A1* | 7/2013 | Kappla | G02B 6/4246 |
| | | | 439/350 |
| 2014/0029895 A1* | 1/2014 | Sasaki | G02B 6/4278 |
| | | | 385/53 |
| 2014/0104808 A1* | 4/2014 | Koutrokois | G02B 6/4277 |
| | | | 403/326 |
| 2014/0134898 A1* | 5/2014 | Wang | H01R 13/635 |
| | | | 439/843 |
| 2014/0153195 A1* | 6/2014 | You | G02B 6/4261 |
| | | | 361/728 |
| 2015/0093083 A1* | 4/2015 | Tsai | G02B 6/4292 |
| | | | 385/92 |
| 2015/0316731 A1 | 11/2015 | Takahashi et al. | |
| 2016/0131859 A1* | 5/2016 | Ishii | G02B 6/4246 |
| | | | 385/92 |
| 2016/0266340 A1* | 9/2016 | Zhang | G02B 6/4284 |
| 2017/0363828 A1* | 12/2017 | Zhu | G02B 6/42 |
| 2021/0141176 A1* | 5/2021 | Lu | G02B 6/4277 |
| 2021/0149133 A1* | 5/2021 | Kuramochi | G02B 6/4277 |

FOREIGN PATENT DOCUMENTS

| | | |
|---|---|---|
| JP | 2006-352068 | 12/2006 |
| JP | 2016-001287 | 1/2016 |
| JP | 2018-508046 | 3/2018 |
| WO | WO 2014/080694 A1 | 5/2014 |

OTHER PUBLICATIONS

Japanese Office Action issued in corresponding Japanese Application No. 2019-207521 dated Mar. 16, 2023.

* cited by examiner

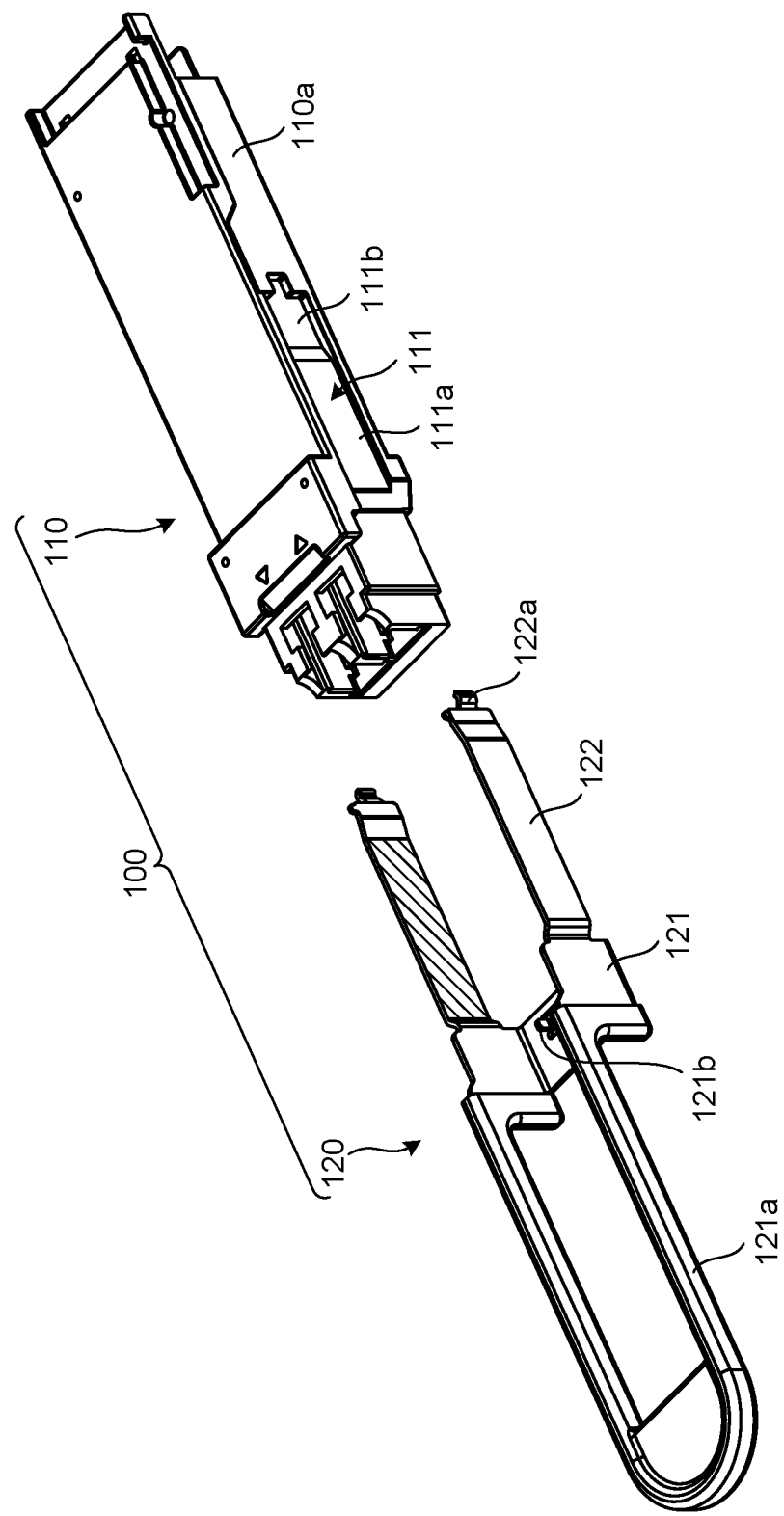

OPTICAL MODULE

CROSS-REFERENCE TO RELATED APPLICATION

This application is based upon and claims the benefit of priority of the prior Japanese Patent Application No. 2019-207521, filed on Nov. 15, 2019, the entire contents of which are incorporated herein by reference.

FIELD

The embodiments discussed herein are related to an optical module.

BACKGROUND

In the related art, as an optical module that connects an optical fiber and transmits and receives an optical signal, there is a pluggable type module (hereinafter, referred to as a "pluggable module"). The pluggable module is electrically connected to an electronic circuit of an optical transmission device, for example, by inserting a module body into a cage provided on a substrate of the optical transmission device. Furthermore, when the module body is inserted into the cage, grooves formed on side surfaces of the module body and latch parts formed on the cage are engaged with each other, so that the pluggable module is locked to the cage. Furthermore, the pluggable module is provided with an engagement release member that releases the engagement between the grooves on the module body side and the latch parts on the cage side when the module body is removed from the cage.

The engagement release member includes, for example, a body provided with a pull tab and slidably attached to the module body and arm parts extending from the body along the grooves on the module body side. When the module body is removed from the cage, the body slides with respect to the module body in response to an external force transmitted via the pull tab. Then, the arm parts slide with respect to the grooves on the module body side in conjunction with the sliding of the body, and release the engagement between the grooves on the module body side and the latch parts on the cage side. With this configuration, in the pluggable module, the locking with respect to the cage is released and the module body is removed from the cage. Related technologies are described in U.S. Pat. No. 9,929,500.

However, between the cage into which the module body is inserted and the module body, there is a gap due to dimensional tolerance and the like. Therefore, electromagnetic waves emitted from the module body may pass through the gap between the cage and the module body and leak from an entrance of the cage. In order to prevent the leakage of the electromagnetic waves, electromagnetic wave shielding terminals are generally provided at the entrance of the cage. The electromagnetic wave shielding terminal is also called an electro-magnetic interference (EMI) finger or an EMI shield. The electromagnetic wave shielding terminal is, for example, an elastic member such as a leaf spring, and elastically contacts the module body inserted into the cage to close the gap between the cage and the module body. With this configuration, it is possible to shield the electromagnetic waves passing through the gap between the cage and the module body.

When the module body is removed from the cage having the electromagnetic wave shielding terminals provided at the entrance thereof, the electromagnetic wave shielding terminals are pressed against the arm parts of the aforementioned engagement release member. In the state in which the electromagnetic wave shielding terminals are pressed against the arm parts, the sliding of the arm parts is hindered by frictional forces at contact surfaces between the grooves on the module body side and the arm parts, and thus releasing the engagement between the grooves on the module body side and the latch parts of the cage by the arm parts is difficult. As a consequence, the locking with respect to the cage is not released, and thus the removal operation of the pluggable module may be hindered.

SUMMARY

According to an aspect of an embodiment, an optical module includes: a module body that is configured to be inserted into a cage, at an entrance of the cage an electromagnetic wave shielding terminal being provided, and has a groove formed on one surface thereof and configured to engage with a latch part formed on the cage; and an engagement release member including a body that is provided with a pull tab configured to transmit an external force for removing the module body, the body being slidably attached to the module body and configured to slide in response to the external force transmitted via the pull tab, and an arm part that extends from the body along the groove, and is configured to slide with respect to the groove in conjunction with the sliding of the body and release the engagement between the groove and the latch part of the cage in a state in which the electromagnetic wave shielding terminal is pressed against the arm part, wherein the module body has a concave part on a surface of the groove, the surface being in contact with the arm part.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 13 is an exploded perspective view illustrating an optical module according to a second embodiment in an exploded manner.

DESCRIPTION OF EMBODIMENTS

Figure 1:
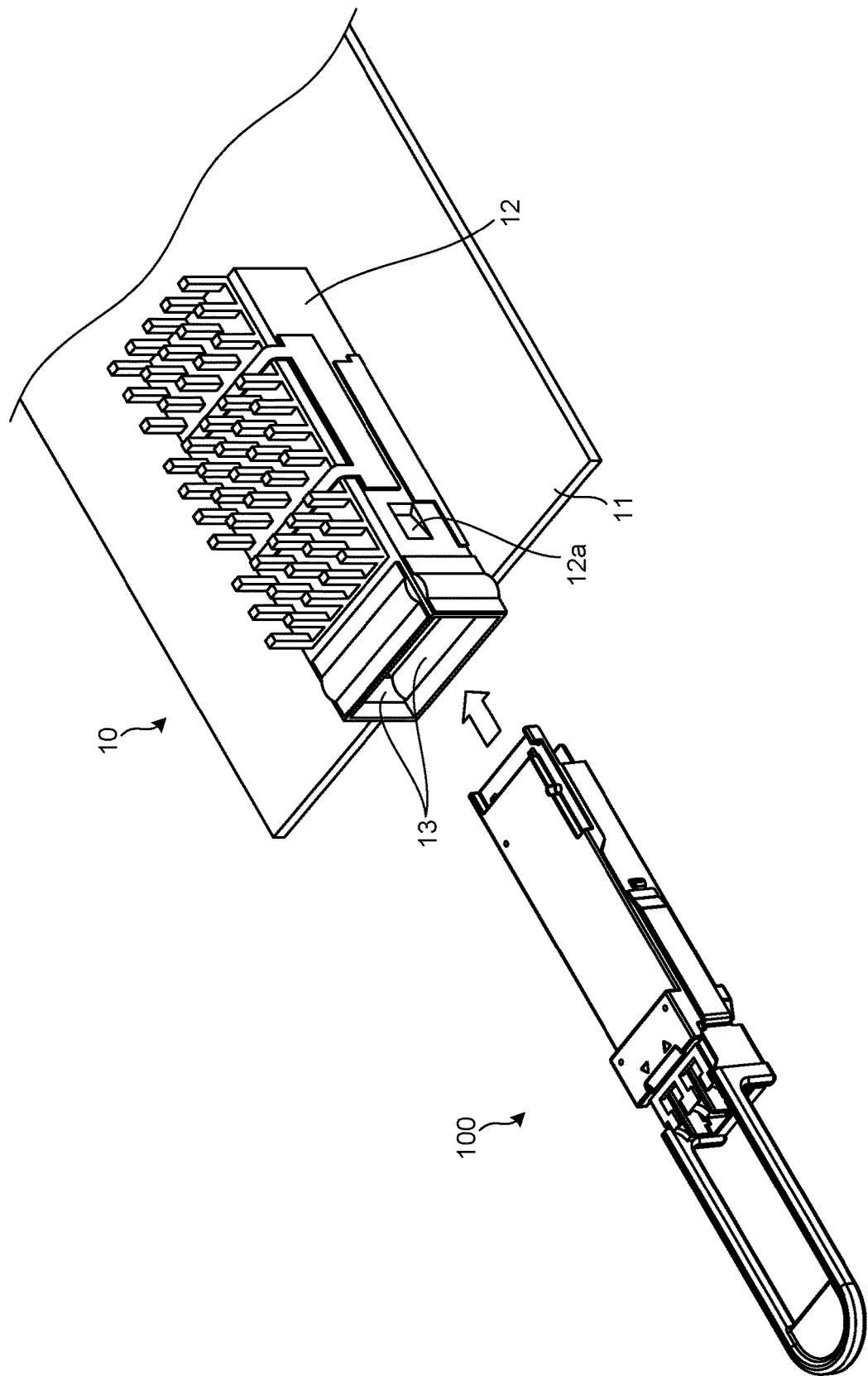
FIG. 1 is a perspective view illustrating an example of a configuration of an optical transmission device in which an optical module according to a first embodiment is incorporated.

Preferred embodiments of the present invention will be explained with reference to accompanying drawings. Furthermore, in each embodiment, the same reference numerals are given to components having the same functions and redundant description thereof is omitted.

[a] First Embodiment

Configuration of Optical Transmission Device

First, a configuration of an optical transmission device 10 in which an optical module 100 according to a first embodiment is incorporated will be described. FIG. 1 is a perspective view illustrating an example of the configuration of the optical transmission device 10 in which the optical module 100 according to the first embodiment is incorporated. The optical transmission device 10 illustrated in FIG. 1 is, for example, a blade-shaped server device, which is detachably attached to a rack (not illustrated), and the like. The optical transmission device 10 has a substrate 11 received in a casing (not illustrated). The substrate 11 is provided thereon with a cage 12. Although the number of cages 12 is one here, the number of cages 12 is not limited thereto. The optical module 100, which is a pluggable module, is inserted into the cage 12. With this configuration, the optical module 100 is electrically connected to an electronic circuit printed on the substrate 11. Note that, in FIG. 1, the direction in which the optical module 100 is inserted into the cage 12 is illustrated by an arrow.

The cage 12 is provided with a lock mechanism for locking the optical module 100 with respect to the cage 12. In the present embodiment, latch parts 12a are formed on the cage 12 as the lock mechanism. The latch part 12a is, for example, a leaf spring, which is bent inward from an inner surface of the cage 12, and the like. Locking by the latch part 12a will be described below.

Furthermore, the cage 12 has electromagnetic wave shielding terminals 13 provided at the entrance thereof. The electromagnetic wave shielding terminal 13 is also called an EMI finger or an EMI shield. The electromagnetic wave shielding terminal 13 protrudes inward on the inner peripheral surface of the entrance of the cage 12. The electromagnetic wave shielding terminal 13 includes an elastic member such as a leaf spring, for example, and elastically contacts the optical module 100 (that is, a module body 110 to be described below) inserted into the cage 12 to shield electromagnetic waves passing through a gap between the cage 12 and the optical module 100.

Configuration of Optical Module

Figure 2:
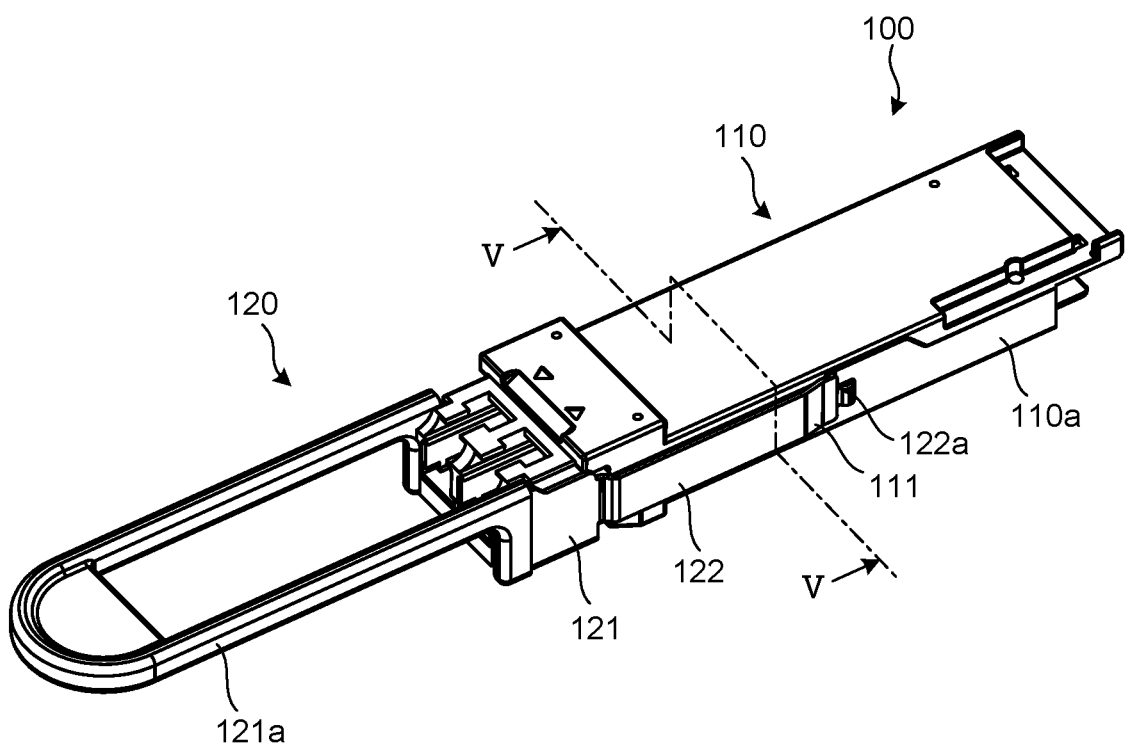
FIG. 2 is a perspective view illustrating an example of a configuration of the optical module according to the first embodiment.
Figure 3:
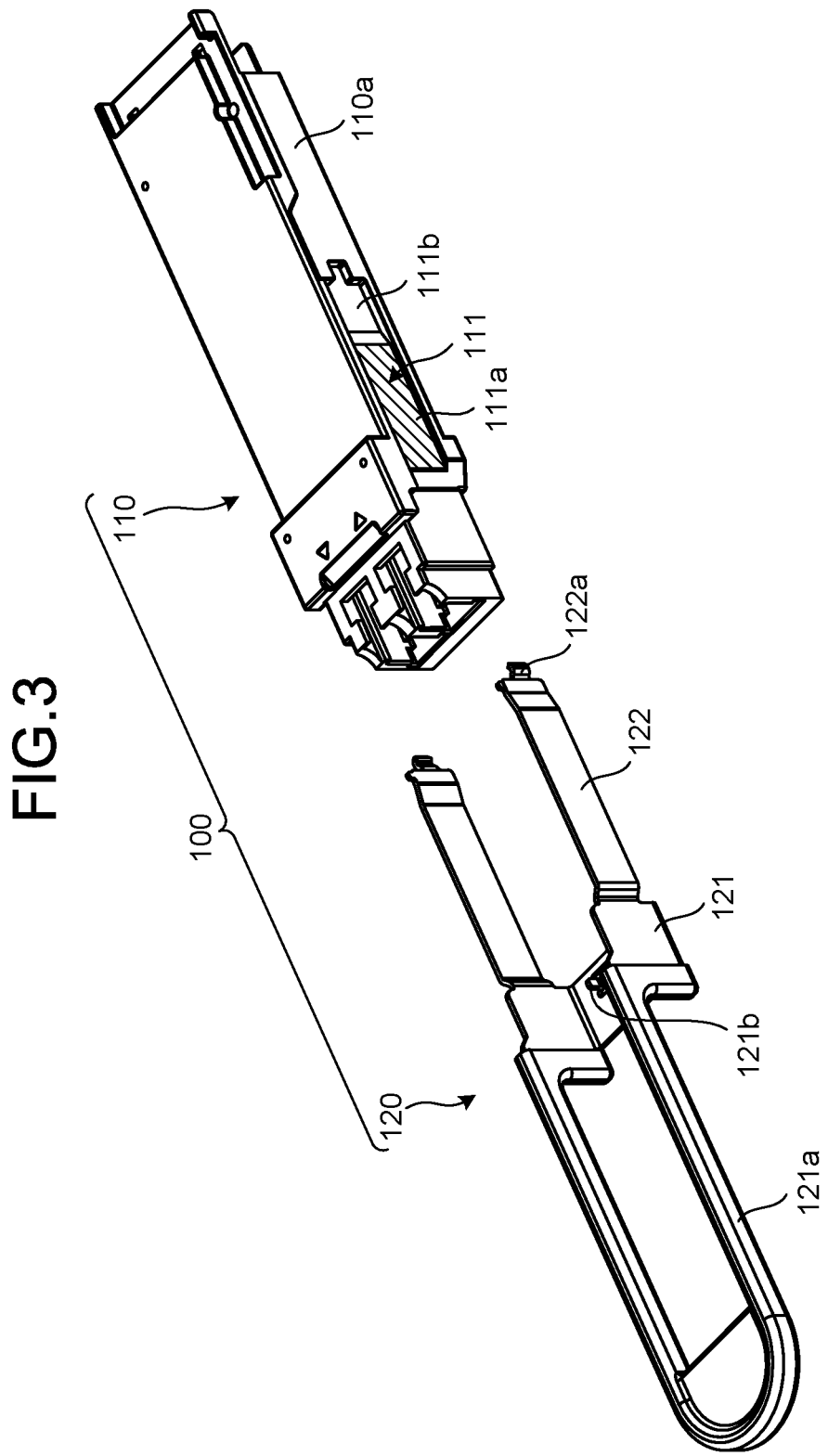
FIG. 3 is an exploded perspective view illustrating the optical module according to the first embodiment in an exploded manner.

FIG. 2 is a perspective view illustrating an example of a configuration of the optical module 100 according to a first embodiment. FIG. 3 is an exploded perspective view illustrating the optical module 100 according to the first embodiment in an exploded manner. As illustrated in FIG. 2 and FIG. 3, the optical module 100 has the module body 110 that can be inserted into the cage 12 and an engagement release member 120.

The module body 110 has a shape corresponding to the cage 12. Specifically, the module body 110 is a box having a bottom surface, an upper surface facing the bottom surface, a pair of facing side surfaces, a front surface, and a back surface. The module body 110 is formed on the side surfaces 110a thereof with grooves 111. The groove 111 includes a bottom surface 111a and a stepped part 111b recessed from the bottom surface 111a. The grooves 111 are engaged with the latch parts 12a formed on the cage 12.

Figure 4:
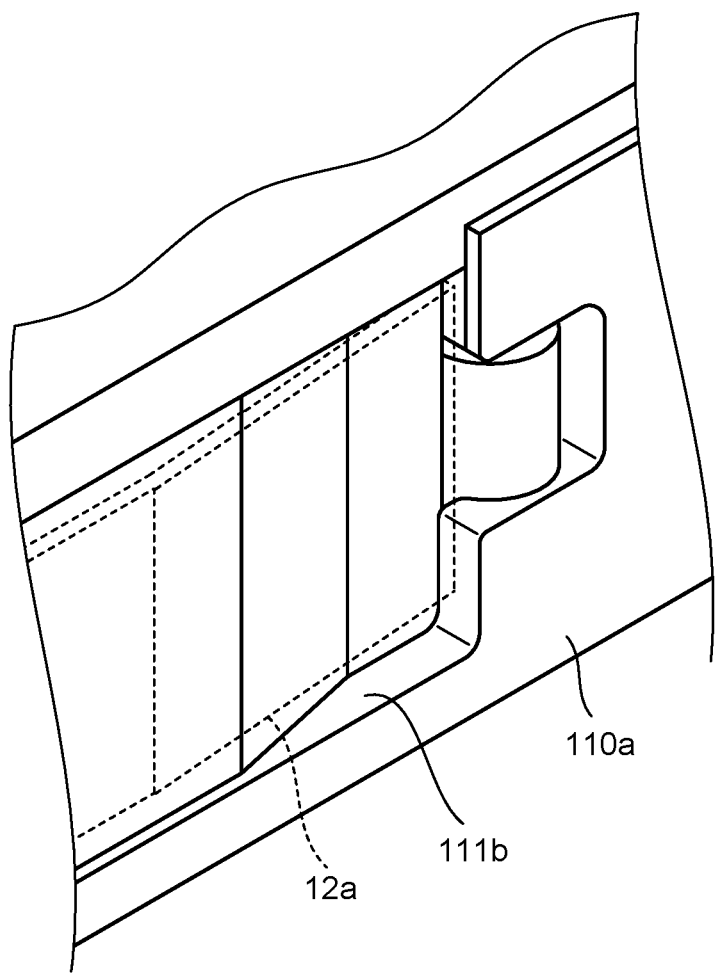
FIG. 4 is an explanation view for explaining engagement between latch parts and grooves.

FIG. 4 is an explanation view for explaining the engagement between the latch parts 12a and the grooves 111. When the module body 110 is inserted into the cage 12, the latch parts 12a of the cage 12 fall into the stepped parts 111b of the grooves 111 and are hooked to the stepped parts 111b as indicated by the broken lines in FIG. 4. With this configuration, the latch parts 12a and the grooves 111 are engaged with each other. The latch parts 12a and the grooves 111 are engaged with each other, so that the optical module 100 is locked to the cage 12.

Returning back to the description of FIG. 2 and FIG. 3, the engagement release member 120 is a member for releasing the engagement between the grooves 111 on the module body 110 side and the latch parts 12a on the cage 12 side when the module body 110 is removed from the cage 12. The engagement release member 120 has a body 121 and two arm parts 122 extending from the body 121.

The body 121 is provided with a pull tab 121a configured to transmit an external force for removing the module body 110 and is slidably attached to the module body 110. Specifically, the body 121 is made of a metal plate, is bent in a substantially C shape so as to surround the bottom surface and the pair of side surfaces 110a of the module body 110, and has at least two hooks 121b (FIG. 3 illustrates only one hook) at parts corresponding to the bottom surface of the module body 110. Then, the hooks 121b are movably hooked in a guide groove (not illustrated) formed on the bottom surface of the module body 110, so that the body 121 is slidably attached to the module body 110. Note that an urging member (not illustrated) is disposed between the hooks 121b and a part of an inner wall surface of the guide groove formed on the bottom surface of the module body 110, and a repulsive force is applied from the urging member to the body 121 so as to hinder the sliding of the body 121. When the module body 110 is removed from the cage 12, the body 121 slides in response to the external force transmitted via the pull tab 121a. That is, the body 121 slides with respect to the module body 110 in the same direction as the direction in which the module body 110 is removed from the cage 12 (that is, the direction opposite to the arrow in FIG. 1) while resisting the repulsive force applied from the aforementioned urging member.

The arm parts 122 extend from the body 121 along the grooves 111 on the module body 110 side. That is, the two arm parts 122 are disposed with the module body 110 interposed therebetween in contact with the bottom surfaces 111a of the corresponding grooves 111. The arm parts 122 slide with respect to the grooves 111 in conjunction with the sliding of the body 121, and release the engagement between the grooves 111 and the latch parts 12a of the cage (see FIG. 4). Specifically, each of the arm parts 122 has a projection part 122a provided at the tip end thereof, the projection part 122a projecting to the same height position as between the stepped part 111b of the groove 111 and the side surface 110a of the module body 110. Then, the arm parts 122 slide with respect to the grooves 111 and lift the latch parts 12a of the cage 12 with the projection parts 122a from the stepped part 111b of the groove 111, thereby releasing the engagement between the grooves 111 and the latch parts 12a of the cage 12. With this configuration, in the optical module 100, the locking with respect to the cage 12 is released, so that the module body 110 is removed from the cage 12.

However, as described above, the cage 12 has the electromagnetic wave shielding terminals 13 provided at the entrance thereof (see FIG. 1), and the electromagnetic wave shielding terminals 13 elastically contact the module body 110 inserted into the cage 12. Therefore, in the state in which the electromagnetic wave shielding terminals 13 are pressed, the arm parts 122 slide with respect to the grooves 111 in conjunction with the sliding of the body 121 and release the engagement between the grooves 111 and the latch parts 12a of the cage 12.

Figure 5:
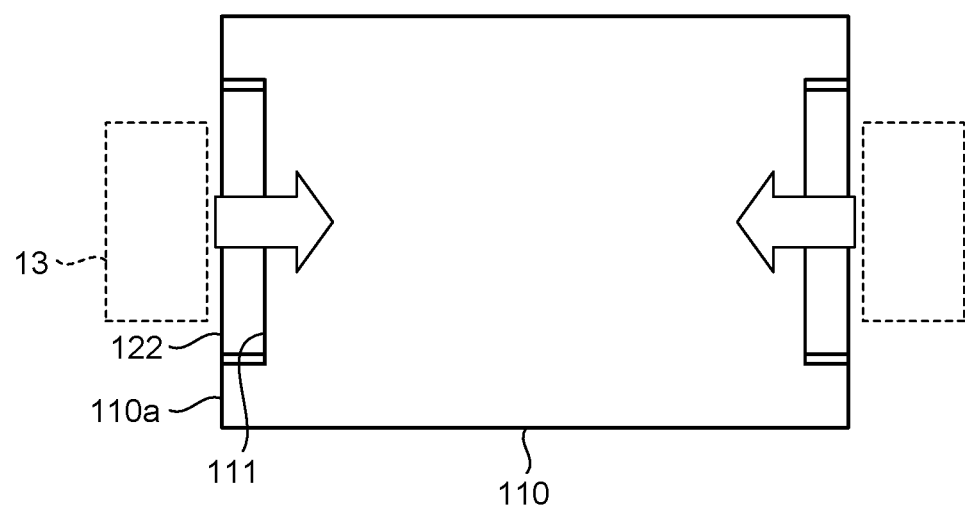
FIG. 5 is a diagram illustrating a state in which electromagnetic wave shielding terminals are pressed against arm parts.

FIG. 5 is a diagram illustrating a state in which the electromagnetic wave shielding terminals 13 are pressed against the arm parts 122. FIG. 5 corresponds to a sectional view taken along line V-V in FIG. 2. As indicated by an arrow in FIG. 5, in the state in which the electromagnetic wave shielding terminals 13 are pressed against the arm parts 122, the sliding of the arm parts 122 is hindered by frictional forces at contact surfaces between the grooves 111 on the module body 110 side and the arm parts 122. When the sliding of the arm parts 122 is hindered, releasing the engagement between the grooves 111 on the module body 110 side and the latch part 12a of the cage 12 by the arm parts 122 is difficult. As a consequence, the locking with respect to the cage 12 is not released, and thus the removal operation of the optical module 100 may be hindered.

Therefore, it is considered to avoid contact between the grooves 111 on the module body 110 side and the arm parts 122 by providing predetermined gaps between the grooves 111 on the module body 110 side and the arm parts 122. However, when the gaps are provided between the grooves 111 on the module body 110 side and the arm parts 122, electromagnetic waves emitted from the module body 110 may pass through the gaps and leak from the entrance of the cage. Therefore, it is not preferable to provide the gaps between the grooves 111 on the module body 110 side and the arm parts 122.

Figure 6:
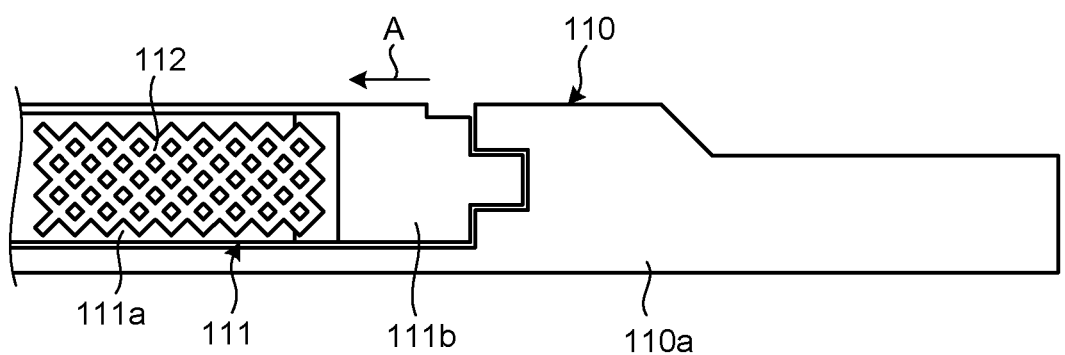
FIG. 6 is a diagram illustrating an example in which a lattice-shaped concave part is formed on a bottom surface of the groove.

In this regard, in the optical module 100 of the present embodiment, the frictional force at the contact surface between the groove 111 on the module body 110 side and the arm part 122 is reduced by forming a concave part on the contact surface between the groove 111 on the module body 110 side and the arm part 122. For example, in the optical module 100, as illustrated in FIG. 6, a lattice-shaped concave part 112 is formed on the bottom surface 111a of the groove 111 of the module body 110, the bottom surface being in contact with the arm part 122. FIG. 6 is a diagram illustrating an example in which the lattice-shaped concave part 112 is formed on the bottom surface 111a of the groove 111. By forming the lattice-shaped concave part 112 on the bottom surface 111a of the groove 111, the bottom surface 111a being in contact with the arm part 122, a surface area of the contact surface between the groove 111 on the module body 110 side and the arm part 122 is reduced by an area corresponding to the lattice-shaped concave part 112. Therefore, the frictional force at the contact surface between the groove 111 on the module body 110 side and the arm part 122 is reduced and the sliding of the arm part 122 is not hindered, so that the engagement between the groove 111 on the module body 110 side and the latch part 12a of the cage 12 is stably released by the arm part 122. As a consequence, it is possible to facilitate the removal operation of the optical module 100.

Furthermore, as illustrated in FIG. 6, the lattice-shaped concave part 112 is formed to be inclined with respect to the direction A in which the arm part 122 slides with respect to the groove 111. That is, the lattice-shaped concave part 112 is formed such that a plurality of slit-shaped concave parts inclined upward with respect to the direction A and a plurality of slit-shaped concave parts inclined downward with respect to the direction A are disposed to intersect with each other. With this configuration, electromagnetic waves emitted from the module body 110 are diffusely reflected and attenuated in the lattice-shaped concave part 112. As a consequence, it is possible to prevent the electromagnetic waves emitted from the module body 110 from being leaked by passing through the lattice-shaped concave part 112.

Figure 7:
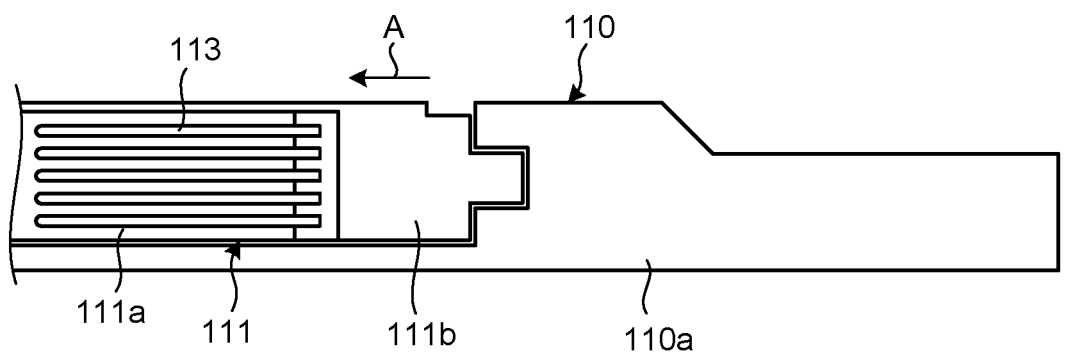
FIG. 7 is a diagram illustrating an example in which a slit-shaped concave part is formed on the bottom surface of the groove.

In the above description, although the case where the lattice-shaped concave part 112 is formed on the bottom surface 111a of the groove 111 of the module body 110, the bottom surface 111a being in contact with the arm part 122, has been described as an example, the shape of the concave part is not limited to the lattice shape. For example, in the module body 110, a slit-shaped concave part may be formed on the bottom surface 111a of the groove 111, the bottom surface 111a being in contact with the arm part 122. FIG. 7 is a diagram illustrating an example in which a slit-shaped concave part is formed on the bottom surface 111a of the groove 111. The module body 110 illustrated in FIG. 7 has a slit-shaped concave part 113 on the bottom surface 111a of the groove 111, the bottom surface 111a being in contact with the arm part 122. The slit-shaped concave part 113 is formed to extend with respect to the direction A in which the arm part 122 slides with respect to the groove 111. With this configuration, the frictional force at the contact surface between the groove 111 on the module body 110 side and the arm part 122 is reduced, so that it is possible to facilitate the removal operation of the optical module 100.

Figure 8:
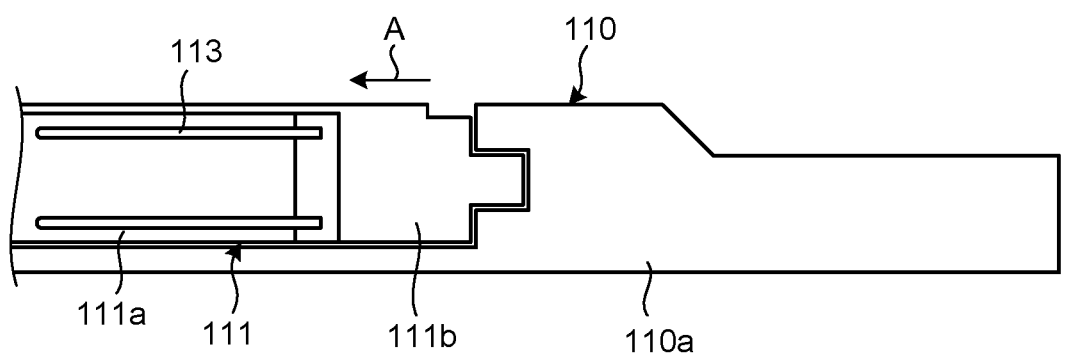
FIG. 8 is a diagram illustrating another example (first example) in which a slit-shaped concave part is formed on the bottom surface of the groove.
Figure 9:
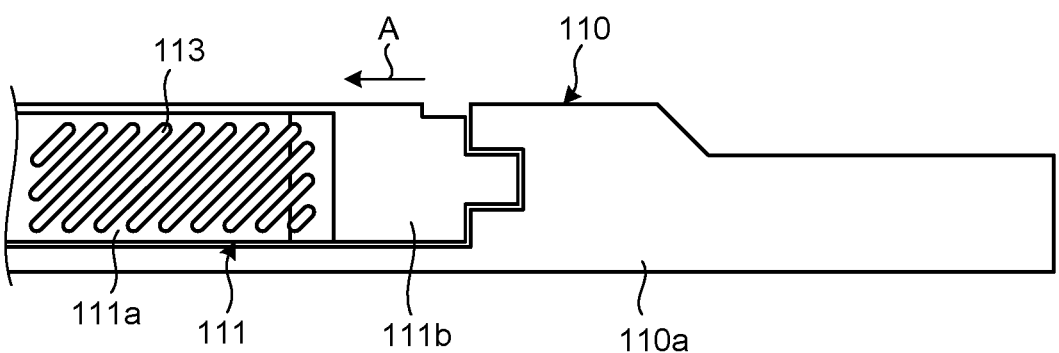
FIG. 9 is a diagram illustrating another example (second example) in which a slit-shaped concave part is formed on the bottom surface of the groove.
Figure 10:
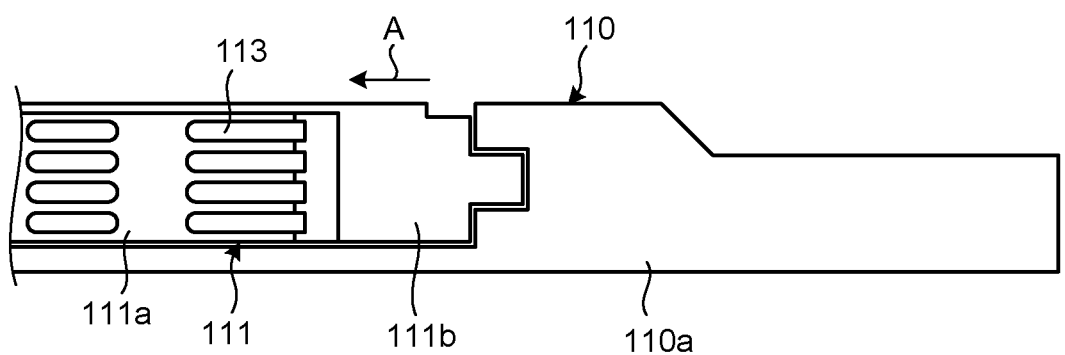
FIG. 10 is a diagram illustrating another example (third example) in which a slit-shaped concave part is formed on the bottom surface of the groove.

As illustrated in FIG. 8, the slit-shaped concave part 113 may be formed to extend in the direction A at upper and lower positions corresponding to both end parts of the arm part 122 in a width direction. FIG. 8 is a diagram illustrating another example (first example) in which the slit-shaped concave part 113 is formed on the bottom surface 111a of the groove 111. By forming the slit-shaped concave part 113 at the upper and lower positions corresponding to both end parts of the arm part 122 in the width direction, it is possible to suppress hooking between the slit-shaped concave part 113 and burrs on both end parts of the arm part 122 in the width direction. As illustrated in FIG. 9, the slit-shaped concave part 113 may be formed to be inclined with respect to the direction A in which the arm part 122 slides with respect to the groove 111. FIG. 9 is a diagram illustrating another example (second example) in which the slit-shaped concave part 113 is formed on the bottom surface 111a of the groove 111. The slit-shaped concave part 113 is inclined with respect to the direction A, so that electromagnetic waves emitted from the module body 110 are reflected and attenuated in the slit-shaped concave part 113 As a consequence, it is possible to prevent the electromagnetic waves emitted from the module body 110 from being leaked by passing through the lattice-shaped concave part 112. The slit-shaped concave part 113 may be divided into a plurality of individual pieces. FIG. 10 is a diagram illustrating another example (third example) in which the slit-shaped concave part 113 is formed on the bottom surface 111a of the groove 111. The slit-shaped concave part 113 illustrated in FIG. 10 is divided into island shapes along the direction A in which the arm part 122 slides with respect to the groove 111.

Figure 11:
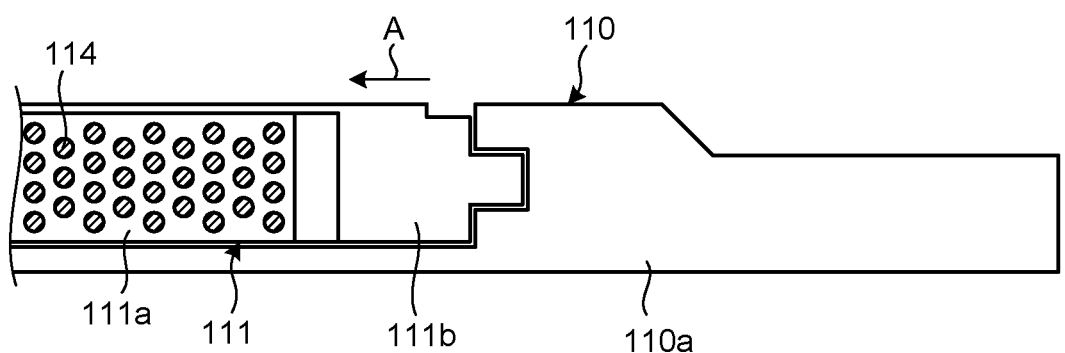
FIG. 11 is a diagram illustrating an example in which a concave part formed of a plurality of bottomed holes is formed on the bottom surface of the groove.

Furthermore, the module body 110 may have a configuration in which a concave part formed of a plurality bottomed holes is formed on the bottom surface 111a of the groove 111, the bottom surface 111a being in contact with the arm part 122. FIG. 11 is a diagram illustrating an example in which a concave part formed of a plurality of bottomed holes is formed on the bottom surface 111a of the groove 111. The module body 110 illustrated in FIG. 11 has a concave part 114 formed of the bottomed holes on the bottom surface 111a of the groove 111, the bottom surface 111a being in contact with the arm part 122. In FIG. 11, a region where the concave part 114 is disposed is indicated by a hatched region. The concave part 114 is formed such that the bottomed holes are disposed in a staggered shape along the direction A in which the arm part 122 slides with respect to the groove 111. With this configuration, electromagnetic waves emitted from the module body 110 are diffusely reflected and attenuated in the concave part 114 formed of the bottomed holes. As a consequence, it is possible to prevent the electromagnetic waves emitted from the module body 110 from being leaked by passing through the concave part 114.

Figure 12:
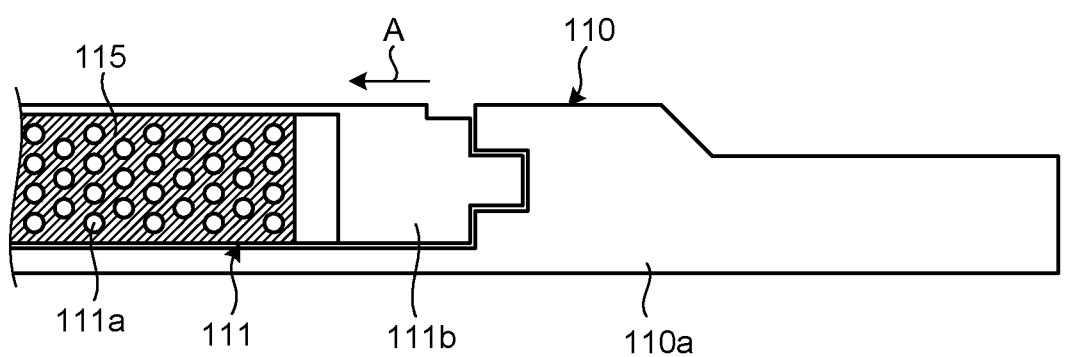
FIG. 12 is a diagram illustrating an example in which a concave part having a shape surrounding a plurality of protrusions is formed on the bottom surface of the groove.

Furthermore, the module body 110 may have a configuration in which a concave part having a shape surrounding a plurality of protrusions is formed on the bottom surface 111a of the groove 111, the bottom surface 111a being in contact with the arm part 122. FIG. 12 is a diagram illustrating an example in which a concave part having a shape surrounding a plurality of protrusions is formed on the bottom surface 111a of the groove 111. The module body 110 illustrated in FIG. 12 has a concave part 115 having a shape surrounding the protrusions on the bottom surface 111a of the groove 111, the bottom surface 111a being in contact with the arm part 122. In FIG. 12, a region where the concave part 115 is disposed is indicated by a hatched region. The concave part 115 is formed by recessing the bottom surface 111a such that the protrusions are disposed in a staggered shape along the direction A in which the arm part 122 slides with respect to the groove 111. With this configuration, electromagnetic waves emitted from the module body 110 are diffusely reflected and attenuated in the concave part 115 having a shape surrounding the protrusions. As a consequence, it is possible to prevent the electromagnetic waves emitted from the module body 110 from being leaked by passing through the concave part 115.

As described above, the optical module 100 according to the present embodiment has the module body 110 and the engagement release member 120. The module body 110 is configured to be inserted into the cage 12 having the electromagnetic wave shielding terminals 13 provided at the entrance thereof, and has a groove 111 formed on one surface thereof and configured to engage with the latch part 12a formed on the cage 12. The engagement release member 120 has the body 121 and the arm parts 122. The body 121 is provided with the pull tab 121a configured to transmit an external force for removing the module body 110, the body 121 being slidably attached to the module body 110 and configured to slide in response to the external force transmitted via the pull tab 121a. The arm parts 122 extend from the body 121 along the grooves 111, and slide with respect to the grooves 111 in conjunction with the sliding of the body 121 and release the engagement between the grooves 111 and the latch parts 12a of the cage 12 in the state in which the electromagnetic wave shielding terminals 13 are pressed. Furthermore, the module body 110 has the lattice-shaped concave part 112, the slit-shaped concave part 113, the concave part 114, or the concave part 115 on the bottom surface 111a of the groove 111, the bottom surface 111a being in contact with the arm part 122. With this configuration, the optical module 100 can facilitate the removal operation of the optical module 100. That is, in the optical module 100, when the module body 110 is removed from the cage 12, even though the electromagnetic wave shielding terminals 13 are pressed against the arm parts 122, it is possible to release the engagement between the grooves 111 and the latch parts 12a of the cage 12 without hindering the sliding of the arm parts 122. Furthermore, since the contact between the electromagnetic wave shielding terminals 13 and the module body 110 is maintained, electromagnetic waves passing through a gap between the cage 12 and the module body 110 can be stably shielded by the electromagnetic wave shielding terminals 13.

Note that the module body 110 may have a concave part including a combination of at least two concave parts selected from the lattice-shaped concave part 112, the slit-shaped concave part 113, the concave part 114, and the concave part 115 on the bottom surface 111a of the groove 111, the bottom surface 111a being in contact with the arm part 122.

[b] Second Embodiment

In the optical module 100 according to the aforementioned first embodiment, the case where the concave part is provided on the bottom surface 111a of the groove 111 of the module body 110, the bottom surface 111a being in contact with the arm part 122, has been described. On the other hand, in an optical module 100 according to the second embodiment, a case where a concave part is provided on a surface of the arm part 122, the bottom surface 111a being in contact with the groove 111, will be described.

FIG. 13 is an exploded perspective view illustrating the optical module 100 according to the second embodiment in an exploded manner. The module body 110 is formed on the side surfaces 110a thereof with the grooves 111. The arm parts 122 of the engagement release member 120 extend from the body 121 along the grooves 111 on the module body 110 side. That is, the two arm parts 122 are disposed with the module body 110 interposed therebetween in contact with the bottom surfaces 111a of the corresponding grooves 111. The arm parts 122 slide with respect to the grooves 111 in conjunction with the sliding of the body 121, and release the engagement between the grooves 111 and the latch parts 12a of the cage 12 (see FIG. 4). Each of the arm parts 122 has a concave part formed on a surface (a surface indicated by oblique lines in FIG. 13) that is in contact with the groove 111. The concave part formed on the arm part 122 has the same shape as that of the lattice-shaped concave part 112, the slit-shaped concave part 113, the concave part 114, or the concave part 115 of the first embodiment, and reduces a frictional force at the contact surface between the groove 111 on the module body 110 side and the arm part 122.

As described above, the optical module 100 according to the present embodiment has the concave part provided on the surface of the arm part 122, the surface being in contact with the groove 111. With this configuration, the optical module 100 can facilitate the removal operation of the optical module 100.

According to an aspect of the optical module disclosed in the present application, there is an effect that it is possible to facilitate the removal operation of the optical module.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical module comprising:
   a module body that is configured to be inserted into a cage, at an entrance of the cage an electromagnetic wave shielding terminal being provided, and has a groove formed on one surface thereof and configured to engage with a latch part formed on the cage; and
   an engagement release member including
      a body that is provided with a pull tab configured to transmit an external force for removing the module body, the body being slidably attached to the module body and configured to slide in response to the external force transmitted via the pull tab, and
      an arm part that extends from the body along the groove, and is configured to slide with respect to the groove in conjunction with the sliding of the body and release the engagement between the groove and the latch part of the cage in a state in which the electromagnetic wave shielding terminal is pressed against the arm part,
   wherein
      the module body has a lattice shaped concave part on a surface of the groove, the surface being in contact with the arm part.

2. The optical module according to claim 1, wherein the lattice-shaped concave part is formed to be inclined with respect to a direction in which the arm part slides with respect to the groove.

3. An optical module comprising:
   a module body that is configured to be inserted into a cage, at an entrance of the cage an electromagnetic wave shielding terminal being provided, and has a groove formed on one surface thereof and configured to engage with a latch part formed on the cage; and
   an engagement release member including
      a body that is provided with a pull tab configured to transmit an external force for removing the module body, the body being slidably attached to the module body and configured to slide in response to the external force transmitted via the pull tab, and
      an arm part that extends from the body along the groove, and is configured to slide with respect to the groove in conjunction with the sliding of the body and release the engagement between the groove and the latch part of the cage in a state in which the electromagnetic wave shielding terminal is pressed against the arm part,
   wherein
      the module body has a slit-shaped concave part on the surface of the groove, the surface being in contact with the arm part, and
      the slit-shaped concave part is formed to be inclined with respect to a direction in which the arm part slides with respect to the groove.

4. The optical module according to claim 3, wherein the slit-shaped concave part is formed to extend with respect to a direction in which the arm part slides with respect to the groove.

5. The optical module according to claim 3, wherein the slit-shaped concave part is divided into island shapes.

6. An optical module comprising:
   a module body that is configured to be inserted into a cage, at an entrance of the cage an electromagnetic wave shielding terminal being provided, and has a groove formed on one surface thereof and configured to engage with a latch part formed on the cage; and
   an engagement release member including
      a body that is provided with a pull tab configured to transmit an external force for removing the module body, the body being slidably attached to the module body and configured to slide in response to the external force transmitted via the pull tab, and
      an arm part that extends from the body along the groove, and is configured to slide with respect to the groove in conjunction with the sliding of the body and release the engagement between the groove and the latch part of the cage in a state in which the electromagnetic wave shielding terminal is pressed against the arm part,
   wherein the module body includes a concave part formed of a plurality of bottomed holes on the surface of the groove, the surface being in contact with the arm part.

7. The optical module according to claim 1, wherein the module body includes a concave part having a shape surrounding a plurality of protrusions on the surface of the groove, the surface being in contact with the arm part.

8. The optical module according to claim 3, wherein the module body includes a concave part having a shape surrounding a plurality of protrusions on the surface of the groove, the surface being in contact with the arm part.

9. The optical module according to claim 6, wherein the module body includes a concave part having a shape surrounding a plurality of protrusions on the surface of the groove, the surface being in contact with the arm part.

* * * * *